United States Patent
Elkenkamp et al.

(10) Patent No.: US 11,745,120 B2
(45) Date of Patent: Sep. 5, 2023

(54) LIGHT-WEIGHT COOLANT BOTTLE

(71) Applicant: Faraday & Future Inc., Gardena, CA (US)

(72) Inventors: Marco Elkenkamp, Marina Del Rey, CA (US); Zion Maffeo, Redondo Beach, CA (US)

(73) Assignee: Faraday & Future Inc., Gardena, CA (US)

( * ) Notice: Subject to any disclaimer, the term of this patent is extended or adjusted under 35 U.S.C. 154(b) by 110 days.

(21) Appl. No.: 17/187,293

(22) Filed: Feb. 26, 2021

(65) Prior Publication Data

US 2021/0178292 A1 Jun. 17, 2021

Related U.S. Application Data

(62) Division of application No. 15/397,924, filed on Jan. 4, 2017, now Pat. No. 10,946,312.

(60) Provisional application No. 62/274,511, filed on Jan. 4, 2016.

(51) Int. Cl.
  *B01D 19/00* (2006.01)
  *F01P 3/00* (2006.01)
(52) U.S. Cl.
  CPC ............ *B01D 19/0042* (2013.01); *F01P 3/00* (2013.01)
(58) Field of Classification Search
  None
  See application file for complete search history.

(56) References Cited

U.S. PATENT DOCUMENTS

| | | | |
|---|---|---|---|
| 3,604,502 A | 9/1971 | Morse et al. | |
| 3,989,103 A | 11/1976 | Cieszko et al. | |
| 4,098,328 A | 7/1978 | Cheong | |
| 5,680,833 A * | 10/1997 | Smith | F01P 11/029 165/104.32 |
| 6,216,646 B1 | 4/2001 | Smith et al. | |
| 2010/0055003 A1 | 3/2010 | Swanson | |

FOREIGN PATENT DOCUMENTS

WO 2014068892 A1 5/2014

* cited by examiner

*Primary Examiner* — Christopher P Jones
*Assistant Examiner* — Phillip Y Shao
(74) *Attorney, Agent, or Firm* — Veros Legal Solutions, LLP

(57) ABSTRACT

Methods and apparatus for de-gasification of vehicle cooling system using a coolant bottle are disclosed. The coolant bottle may include a coolant entrance port configured to be in fluid communication with the vehicle cooling system, and a coolant egress port configured to be in fluid communication with the vehicle cooling system. The coolant egress port is directly connected to the vehicle cooling system. The coolant bottle may further include a plurality of baffle plates placed to divide an interior of the coolant bottle into a plurality of coolant channels. Each baffle plate may include a plurality of apertures configured to provide fluid communication between the plurality of coolant channels.

5 Claims, 6 Drawing Sheets

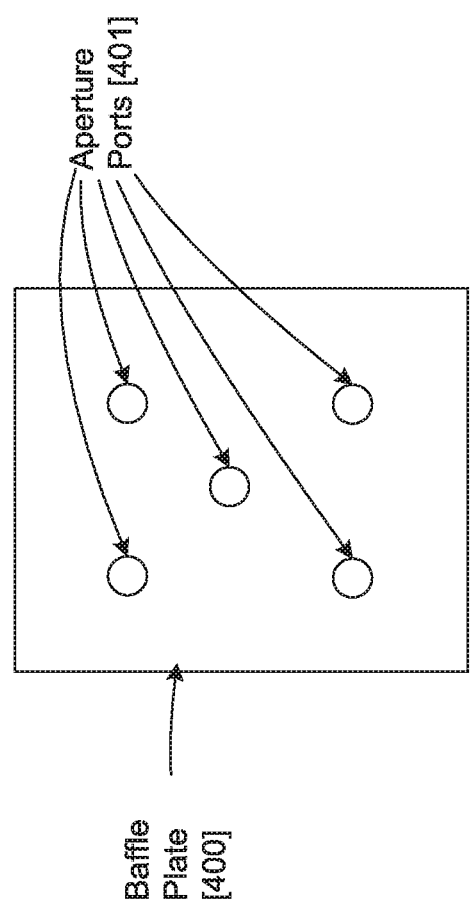

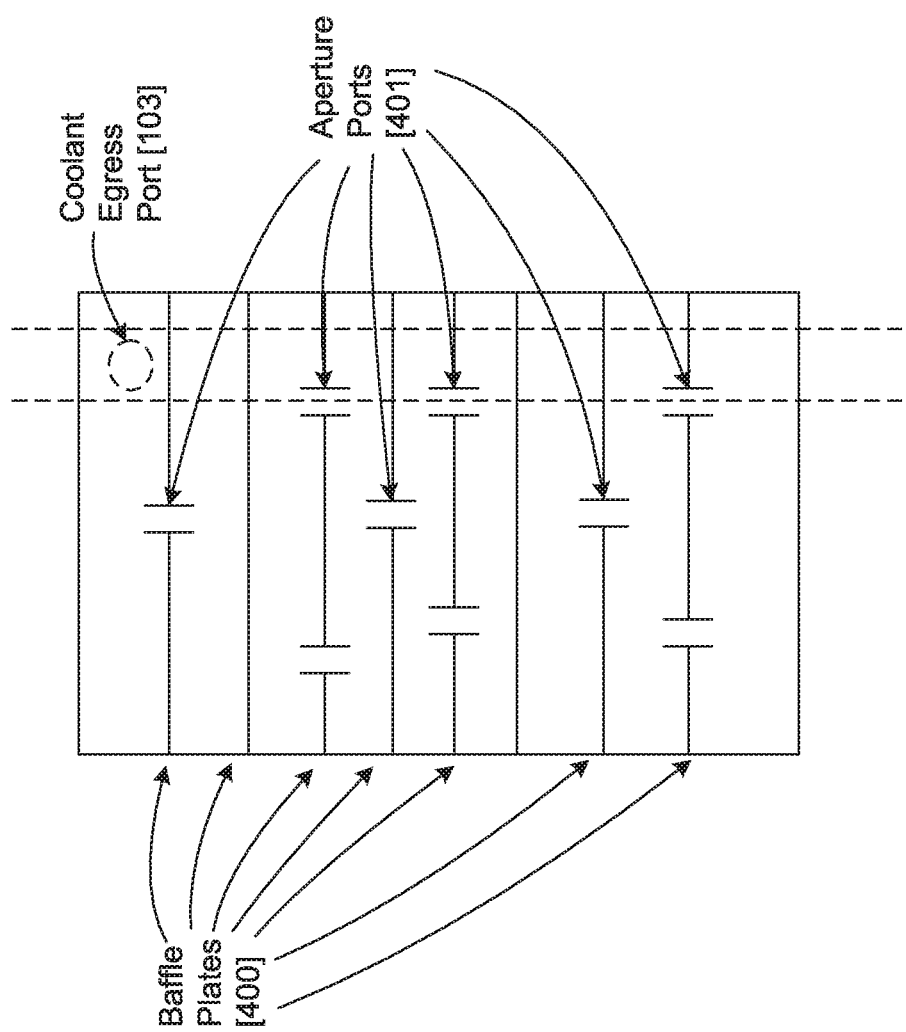

LIGHT-WEIGHT COOLANT BOTTLE

CROSS-REFERENCE TO RELATED APPLICATIONS

This application claims the benefit of U.S. Provisional Application No. 62/274,511, filed on Jan. 4, 2016 and U.S. Non-provisional application Ser. No. 15/397,924, filed Jan. 4, 2017, the entirety of which is hereby incorporated by reference.

TECHNICAL FIELD

This disclosure relates generally to methods, systems, and apparatus to de-gas a liquid, and more specifically to a vehicle cooling system reservoir configured to de-gas a vehicle coolant while providing room for expansion to the vehicle coolant.

BACKGROUND

Vehicle cooling systems generally use one or more liquids to regulate the temperature of various powertrain components. For example, many traditional internal combustion engines utilize a vehicle cooling system that directs a liquid through specially designed channels within the engine and then out into a radiator where the liquid is cooled by heat transfer to the surrounding environment. Some electric vehicles utilize a similar vehicle cooling system to transfer heat from the electric vehicle's motor and battery compartment via a liquid intermediary.

Vehicle cooling systems using internal combustion engines, electric motors, or any combination thereof often use cooling liquids with high specific heat capacity. Many such cooling liquids have a specific heat capacity that is much higher than that of the specific heat capacity of either the external atmosphere or the respective liquids' gas state. However, as the cooling liquid absorbs heat from a vehicle's powertrain components it may undergo a phase change into its gas phase. Such gas in the cooling liquids may affect the cooling performance.

The disclosed systems and method are designed to de-gas the cooling liquid within the vehicle cooling system.

SUMMARY

The systems and methods of this disclosure each have several innovative aspects, no single one of which is solely responsible for its desirable attributes. Without limiting the scope as expressed by the claims that follow, its more prominent features will now be discussed briefly. Disclosed herein is a lightweight, low cost, optimized vehicle coolant bottle that may provide de-gasification for a vehicle cooling system.

One aspect of the disclosure is directed to a coolant bottle. The coolant bottle may include a coolant entrance port configured to be in fluid communication with the vehicle cooling system, and a coolant egress port configured to be in fluid communication with the vehicle cooling system. The coolant egress port is directly connected to the vehicle cooling system. The coolant bottle may further include a plurality of baffle plates placed to divide an interior of the coolant bottle into a plurality of coolant channels. Each baffle plate may include a plurality of apertures configured to provide fluid communication between the plurality of coolant channels.

Another aspect of the disclosure is directed to a method of de-gasifying a coolant fluid using the coolant bottle above. The method may include feeding coolant fluid 108 to be degassed through coolant entrance port 103 into a top portion of coolant bottle 100. The method further includes substantially degassing coolant fluid 108 while inside coolant bottle 100. The method may also include directing the degassed coolant fluid to exit coolant bottle 100 and directly reenter a vehicle cooling system through coolant egress port 104 that is directly connected to vehicle cooling system 10.

Yet another aspect of the disclosure is directed to a vehicle. The vehicle may include a vehicle cooling system using at least one coolant fluid, and a coolant bottle made of a material impermeable to the at least one coolant fluid used by the vehicle cooling system. The coolant bottle may include a coolant entrance port configured to be in fluid communication with the vehicle cooling system, and a coolant egress port configured to be in fluid communication with the vehicle cooling system. The coolant egress port is directly connected to the vehicle cooling system. The coolant bottle may further include a plurality of baffle plates placed to divide an interior of the coolant bottle into a plurality of coolant channels. Each baffle plate may include a plurality of apertures configured to provide fluid communication between the plurality of coolant channels.

BRIEF DESCRIPTION OF THE DRAWINGS

The structures and function set out in this disclosure can be best understood from the description herein in conjunction with the accompanying figures. The figures are not necessarily to scale, emphasis instead generally being placed upon illustrative principles. The figures are to be considered illustrative in all aspects and are not intended to limit the disclosure, the scope of which is defined only by the claims.

FIG. 4a depicts an exemplary baffle plate, in accordance with one embodiment of the disclosure;

FIG. 5 depicts an exemplary cutaway bottom view of a coolant bottle, in accordance with one embodiment of the disclosure.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways.

Figure 1:
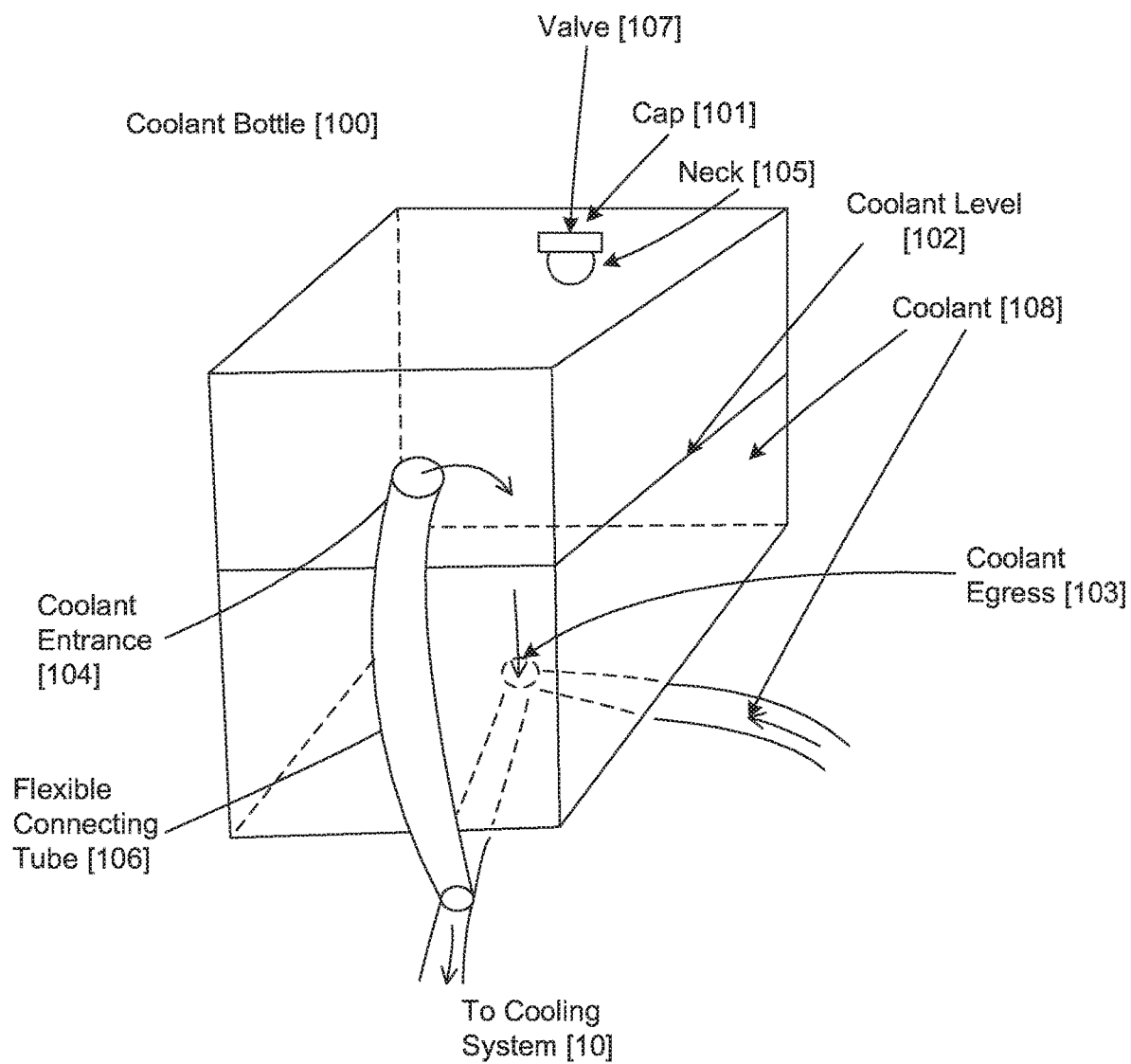
FIG. 1 depicts an exemplary schematic perspective diagram of a coolant bottle, in accordance with an embodiment of the disclosure.

FIG. 1 depicts an exemplary schematic perspective diagram of a coolant bottle 100, in accordance with an embodiment of the disclosure. Coolant bottle 100 is configured to hold a liquid coolant 108 from a cooling system 10. Coolant bottle 100 may include a coolant egress port 103, a coolant entrance port 104, a neck 104, and a cap 101. The liquid coolant may be filled with coolant 108 to a coolant level 102 of coolant bottle 100. Coolant egress port 103 may be positioned below coolant level 102 during normal operation of cooling system 10. Coolant entrance port 104 may be located above coolant level 102 during normal operation of cooling system 10. Coolant cap 101 is removably coupled to neck 105 so that cap 101 and neck 105 may collectively seal coolant bottle 100. Both coolant cap 101 and neck 105 may be located above coolant level 102 during normal operation of cooling system 10. Neck 105 may be formed from a material that is impermeable to one or more liquid coolants. Neck 105 may be configured so that there is an aperture through the entire length of neck 105. As a result, the coolant and/or gasses may flow freely through the entire length of neck 105.

Coolant bottle 100 can be any shape, such as a rectangular cuboid as depicted in FIG. 1, a cube, a sphere, a cylinder, a cone, or any other suitable shape. In one embodiment, the volume of coolant bottle 100 may be designed such that under normal operating conditions coolant from the cooling system 10 will not fully fill coolant bottle 100 (i.e., coolant level 102 not all the way to the top of coolant bottle 100). Accordingly, coolant bottle 100 may contain a void where there is no coolant. For example, the void may be located above coolant level 102 during normal operation of the cooling system. Degasification of gases dissolved in coolant 108 may occur in the void.

Coolant bottle 100 may be made of a variety of materials impermeable to one or more vehicle coolants. For example, coolant bottle 100 can be manufactured from a plastic material using a 3D printing process, traditional form press manufacturing, injection molding, seam welding, or other suitable methods. Additionally, coolant bottle 100 can also be formed from any light weight corrosive-resistant metals or their combinations, such as aluminum or titanium, carbon fiber, fiberglass, a fiberglass reinforced plastic, or other composite materials. In some embodiments, coolant bottle 100 may have the interior areas of its surface marked with gashes between 0.1 mm and 0.5 mm in depth, pitted or otherwise scored to provide nucleation sites for de-gasification.

Coolant 108 may be any liquid known in the art that is useful in a vehicle heat pump system. An exemplary but non-exhaustive list of cooling fluids include: water, methanol, methanol and water, propylene glycol, propylene glycol and water, glycerol, glycerol and water, ethylene glycol, ethylene glycol and water, synthetic oil, poly-alpha-olefin (or poly-α-olefin, also abbreviated as PAO) oil, liquid dielectric cooling, and the like.

According to some embodiments, cap 101 may be attached to neck 105 and form an air tight seal. This configuration may allow cooling system 10 to operate at higher pressures and temperatures than would be possible under normal atmospheric temperatures and pressures. By operating at higher pressures, cooling system 10 may raise the boiling point of coolant 108 such that coolant 108 may absorb more energy without undergoing a phase change to a gas. Further, in a cooling system 10 optimized for operation at higher pressures, coolant bottle 100 may be further configured to withstand internal pressures of, for example, 0.5 atm-5 atm.

In other embodiments, cap 101 may further include a one-way pressure relief valve 107 that allows excess pressure in coolant bottle 100 to be released. Pressure relief valve 107 may expose coolant 108 to a lower partial pressure environment than that is in the rest of cooling system 10. A lower partial pressure environment may be advantageous for de-gasification. When coolant 108 is exposed to a lower partial pressure, gases in coolant 108 may become less soluble and de-gasification occurs. Pressure relief valve 107 may be opened to release pressure when the internal pressure of coolant bottle 100 exceeds a predetermined threshold. Upon such a pressure release, the partial pressure of gases at the surface of coolant level 102 in coolant bottle 100 is lower than the partial pressure of gases dissolved in the rest of coolant 108.

In some embodiments, coolant entrance port 104 may be located near the top portion of coolant bottle 100. Various factors may be considered while determining the precise location of coolant entrance port 104. For example, coolant entrance port 104 may be placed above the estimated average coolant level 102 in coolant bottle 100. Coolant entrance port 104 may be communicatively attached to cooling system 10 via a connecting tube 106. Connecting tube 106 may be made of materials such as, but not limited to, high temperature polymers, rubber, stainless steel braided hose, stainless steel pipe, copper pipe, silicone, or other suitable materials known to manufactures of automotive cooling systems.

In some embodiments, coolant egress port 103 may be located near the bottom portion of coolant bottle 100. Coolant egress port 103 may be communicatively coupled to cooling system 10 such that no additional hoses or connectors are needed. In some embodiments, such a communicative coupling may not require the use of an additional connecting tube as used for coolant entrance port 104, thus limiting the number of connecting tubes used in coolant bottle 100. As a result, a vehicle cooling system implementing the disclosed coolant bottle 100 may be lighter in weight, cheaper to build, and easier to maintain.

Figure 2:
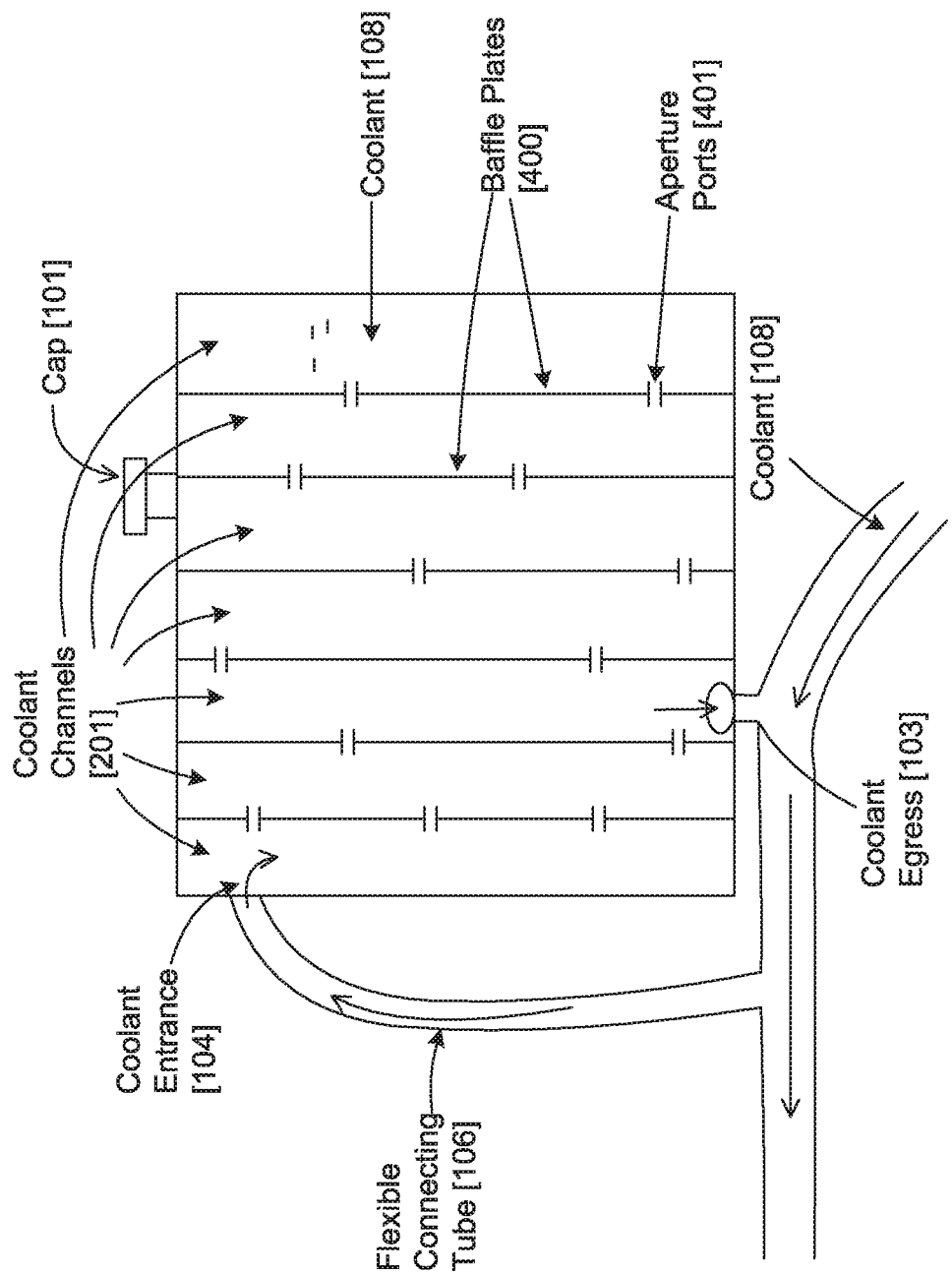
FIG. 2 depicts an exemplary cross-section view of a coolant bottle, in accordance with an embodiment of the disclosure.

FIG. 2 depicts an exemplary cross-section view of coolant bottle 100, in accordance with an embodiment of the disclosure. As shown in FIG. 2, a plurality of baffle plates 400*a*, 400*b*, . . . 400*n* (collectively referred to as baffle plates 400) are installed longitudinally reaching from the top surface to the bottom surface of coolant bottle 100 and further extending from the fore side wall to the aft side wall of coolant bottle 100. Each of the plurality of baffle plates 400 may be positioned so that it is flush with the surface of both the top and bottom of coolant bottle 100. Similarly, each of the plurality of baffle plates 400 may be positioned so that it is flush with both the fore side wall and aft side wall of coolant bottle 100. The bottom, top, fore side wall, and aft side wall are all physically attached to the respective side of baffle plates 400 such that a tight seal is formed along the entire edge of each wall of the baffle plates 400. This tight seal prevents coolant 108 in coolant bottle 100 from passing around baffle plates 400. Thus the baffle plates 400 form a plurality of coolant channels 201*a*, 201*b*, . . . 201*n*, . . . (collectively referred to as coolant channels 201). Each of the plurality of coolant channels 201 are fluidly communicated with each other via a plurality of aperture ports 401*a*, 401*b*, . . . 401*n*, . . . (collectively referred to as aperture ports 401). Each of the plurality of aperture ports 401 may be located in the respective baffle plates 400 and are designed to allow both coolant 108 and gases to flow across each coolant channel 201. Such a design may limit the movement of transverse waves from one coolant channel to the next thus limiting the spread of turbulence through the entire coolant bottle 100.

Figure 3:
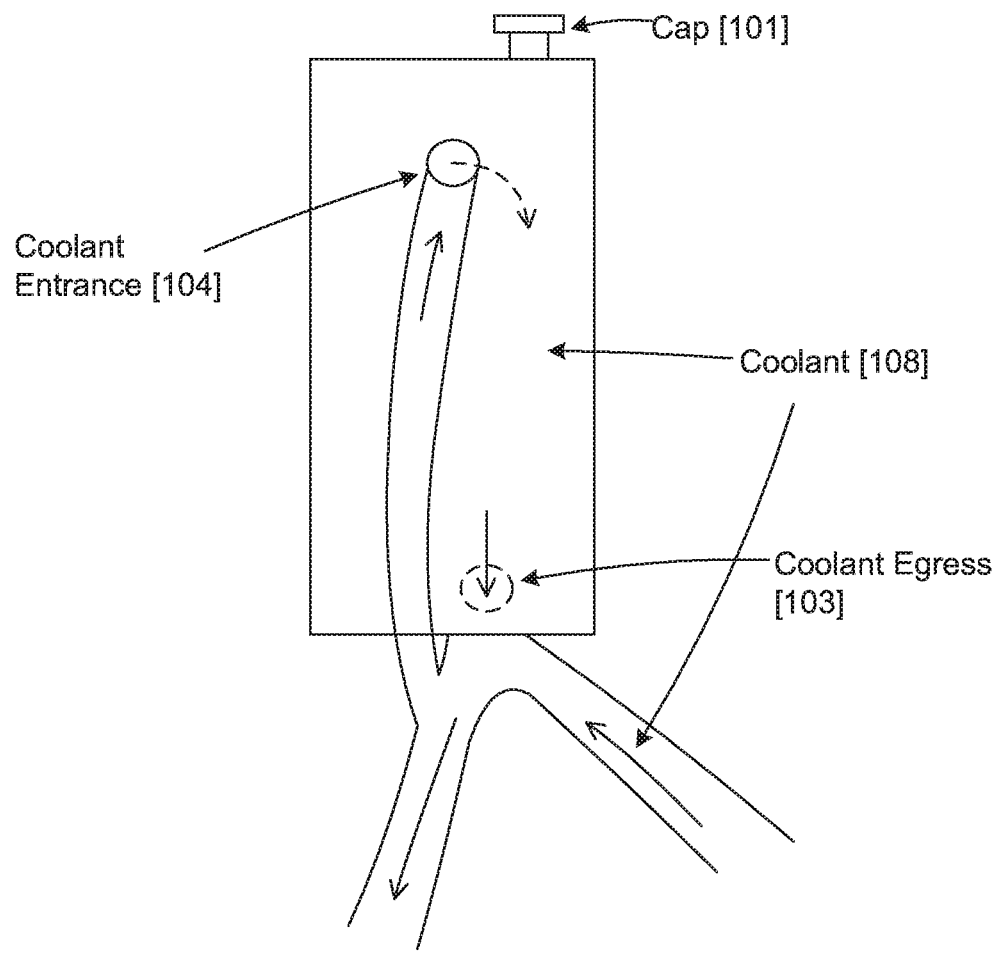
FIG. 3 depicts an exemplary front view of a coolant bottle, in accordance with an embodiment of the disclosure.

FIG. 3 depicts an exemplary front view of coolant bottle 100, in accordance with an embodiment of the disclosure. In some embodiments, coolant entrance port 104 may be connected in a location that is equidistant in the horizontal plane between the fore and aft side walls and in the upper quadrant of the vertical plane. In some embodiments, coolant bottle 100's front face may be planar in geometry and substantially narrower than the fore and aft walls, as shown in the rectangular cuboid embodiments in FIGS. 1, 2, 3, and 5. In other embodiments, coolant bottle 100 may have a front face that contains one or more angles, bulges, and/or indents to serve packaging and vehicle connectivity needs. Other minor deviations in coolant bottle 100 shape are contemplated and may not affect the features disclosed in the present application.

FIG. 4a depicts an exemplary baffle plate 400, in accordance with one embodiment of the disclosure. Baffle plate 400 may be made from a variety of materials and in a variety of shapes and sizes suitable for the uses described herein. By way of an example, baffles plate 400 may be manufactured from a plastic material using a 3D printing process. Baffle plate 400 may also be formed from a light weight corrosive-resistant metal, such as aluminum or titanium, carbon fiber, fiberglass, a fiberglass reinforced plastic, or other composite materials. In some embodiments, battle plate 400 may have areas of its surface marked with gashes between 0.1 mm and 0.5 mm in depth, pitted, or otherwise scored to provide nucleation sites for de-gasification.

Baffle plate 400 may include a plurality of aperture ports 401. In some embodiments, each aperture port 401 in baffle plate 400 may be located at an equidistance from the adjacent aperture ports and the edges of baffle plate 400. Such a configuration may provide maximum structural rigidity for baffle plate 400.

Figure 4B:
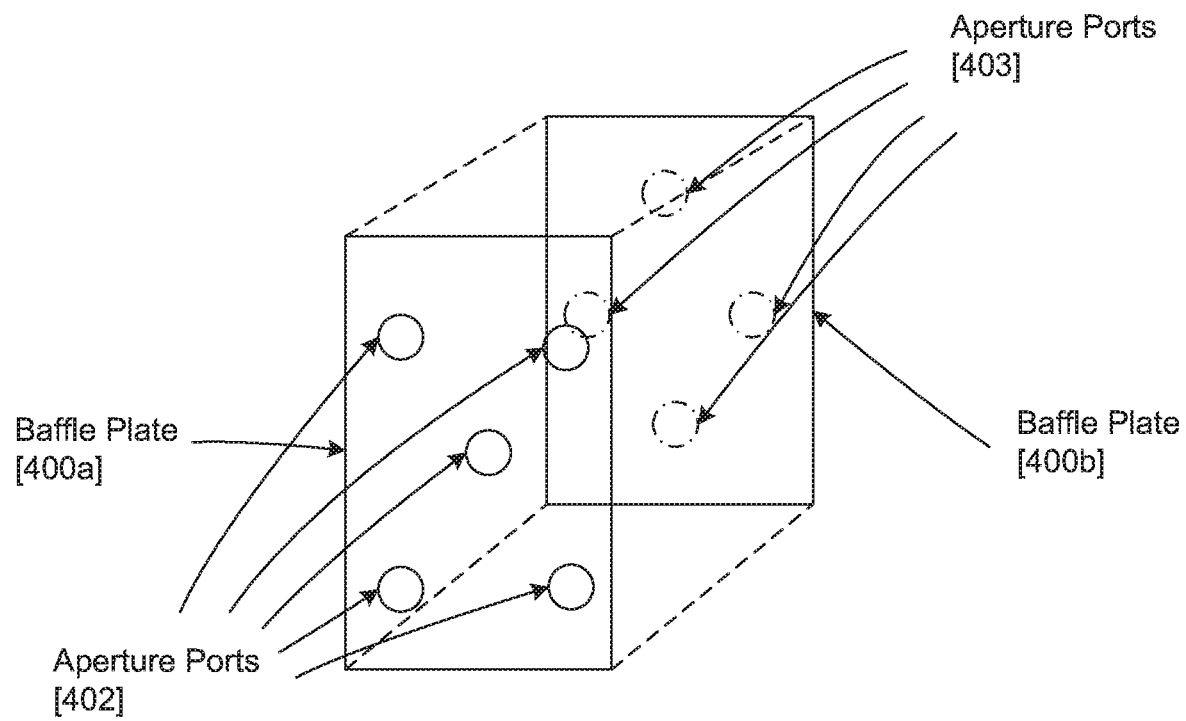
FIG. 4b depicts a perspective view of an exemplary set of parallel baffle plates with non-aligned aperture ports, in accordance with one embodiment of the disclosure.
Figure 4C:
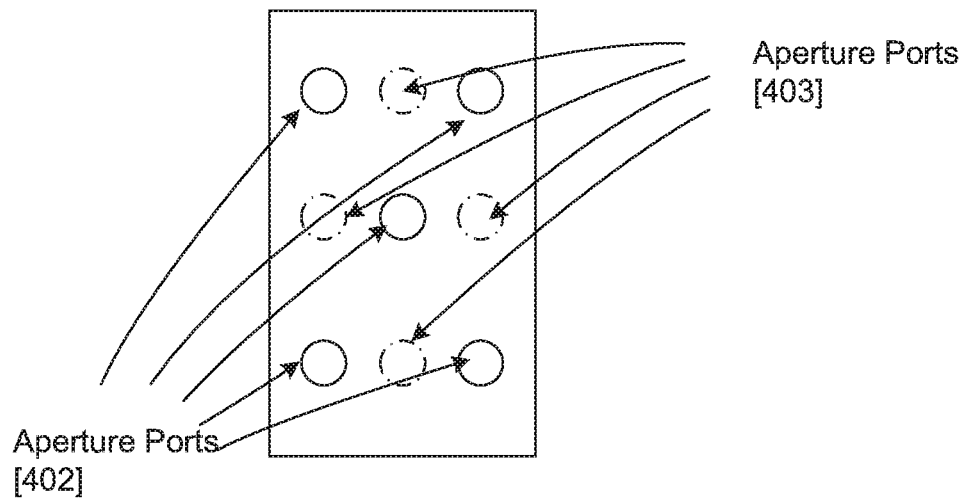
FIG. 4c depicts a front view of an exemplary set of parallel baffle plates with non-aligned aperture ports, in accordance with one embodiment of the disclosure.

In some embodiments, aperture ports in two parallel baffle plates may be specifically configured so that locations of aperture ports 401 on the first baffle plate do not align with locations of aperture ports 401 on the second baffle plate. For example, FIG. 4b depicts a perspective view of an exemplary set of parallel baffle plates 400a and 400b with non-aligned aperture ports 402 and 403, in accordance with one embodiment of the disclosure, and FIG. 4c depicts a front view of an exemplary set of parallel baffle plates with non-aligned aperture ports, in accordance with one embodiment of the disclosure. As shown in FIGS. 4b and 4c, baffle plate 400a includes aperture ports 402 located near center and the four corners of the plate, and baffle plate 400b parallel to baffle plate 400a includes aperture ports 403 located near the center of each edge. As such, aperture ports 402 and aperture ports 403 do not align with each other. For example, from the front view shown in FIG. 4c, aperture ports 402 and 403 form a 3×3 array.

In a further embodiment, baffle plate 400 may be configured with aperture ports 401 of different sizes. By way of an example, one embodiment of baffle plate 400 may include aperture ports 401 sized between 2.1 mm-10 mm in diameter. In other embodiments, baffle plate 400 may include aperture ports sized between 0.1 mm-2 mm. In a further embodiment baffle plate 400 may include larger aperture ports 401 located in the region that are generally submerged below coolant level 102 and smaller aperture ports 401 located in the void region located above the coolant level 102.

FIG. 5 depicts an exemplary cutaway bottom view of coolant bottle 100, in accordance with one embodiment of the disclosure. FIG. 5 shows a plurality of baffle plates 400 parallel to each other. Each parallel baffle plate 400 may have one or more aperture ports 401 or no aperture port. This differentiation in horizontal locations of aperture ports 401 across a set of parallel baffle plates may direct coolant 108 to flow in a nonlinear fashion. Accordingly, wave energy flowing through coolant bottle 100 may be distributed among coolant channels 201, thus limiting turbulence in coolant bottle 100.

Consistent with the disclosure, a coolant de-gasification method can be performed using the disclosed coolant bottles, such as coolant bottle 100. The method may include feeding coolant fluid 108 to be degassed through coolant entrance port 104 into a top portion of the coolant bottle 100. Coolant fluid 108 may be substantially degassed while inside coolant bottle 100. The method may than directing the degassed coolant fluid to exit coolant bottle 100 and directly reenter vehicle cooling system 10 through coolant egress port 103 that is directly connected to the vehicle cooling system. While inside coolant bottle 100, coolant fluid 108 may be directed to flow cross coolant channels 201.

Unless otherwise indicated, all numbers expressing lengths, widths, depths, or other dimensions, and so forth used in the specification and claims are to be understood in all instances as indicating both the exact values as shown and as being modified by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. It is contemplated any specific value disclosed may vary within a reasonable range.

The terms "a," "an," "the," and similar referents used in the context of describing the disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of any claim. No language in the specification should be construed as indicating any non-claimed element essential to the practice of the disclosure.

Groupings of alternative elements or embodiments disclosed herein are not to be construed as limitations. Each group member may be referred to and claimed, individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments are described herein, including the best mode known to the inventor for carrying out the spirit of the present disclosure. Of course, variations on these described embodiments will become apparent to those of ordinary skill in the art upon reading the foregoing description. The inventor expects skilled artisans to employ such variations as appropriate, and the inventor intends for the disclosure to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

Though described with reference to vehicle cooling system, the present disclosure is not limited to use in a vehicle. For example, the disclosed coolant bottle may be used in other systems that uses coolant for cooling purpose.

It will be apparent to those skilled in the art that various modifications and variations can be made to the disclosed coolant bottle. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. A method of de-gasifying a coolant fluid using a coolant bottle, the coolant bottle including at least a first opening and a second opening, the first opening comprising a coolant entrance port located on a top of the coolant bottle, the second opening comprising a coolant egress port located at a bottom of the coolant bottle, the coolant bottle further comprising a plurality of baffle plates, the baffle plates positioned to divide an interior of the coolant bottle into a plurality of coolant channels, each of the plurality of baffle plates including a plurality of apertures configured to provide fluid communication between the plurality of coolant channels, the method comprising:

feeding a coolant fluid to be degassed through the coolant entrance port into a top portion of the coolant bottle;

substantially degassing the coolant fluid while inside the coolant bottle; and directing the degassed coolant fluid to exit the coolant bottle and directly reenter a vehicle cooling system through the coolant egress port that is directly connected to the vehicle cooling system;

wherein the plurality of baffle plates comprises a first set of baffle plates and a second set of baffle plates, the first set of baffle plates each including a plurality of first apertures in a first configuration, wherein each aperture in the first configuration is located at an equidistance from adjacent apertures and edges of the respective baffle plate, and the second set of baffle plates each including a plurality of second apertures in a second configuration, wherein the first apertures do not align with any of the second apertures;

wherein the first set of baffle plates are placed in parallel with the second set of baffle plates; and wherein substantially degassing the coolant fluid while inside the coolant bottle further comprises directing the coolant fluid to flow in a nonlinear fashion by a differentiation in horizontal locations of first and second apertures.

2. The method of claim 1, wherein the coolant bottle further includes a first set of baffle plates each including a plurality of first apertures in a first configuration;

a second set of baffle plates each including a plurality of second apertures in a second configuration, wherein the first apertures do not align with any of the second apertures when the first set of baffle plates are placed in parallel with the second set of baffle plates, the method further comprising: directing the coolant fluid to flow across the coolant channels through the first apertures and second apertures.

3. The method of claim 1, wherein each baffle plate is scored and pitted to create bubble nucleation sites.

4. The method of claim 1, further comprising: opening a pressure relief valve located within a cap on the top of the coolant bottle at a pressure of about 1 atm.-5 atm.

5. The method of claim 1, further comprising distributing wave energy flowing through the coolant bottle among the plurality of coolant channels and limiting turbulence in the coolant bottle.

* * * * *